Aug. 25, 1959    A. O. C. NIER    2,901,624
MASS SPECTROMETRY

Filed Sept. 2, 1947    6 Sheets-Sheet 2

Fig. 3.

Inventor
Alfred O. C. Nier

By
Attorney

FIG. 5

Inventor
Alfred O.C. Nier

Aug. 25, 1959 A. O. C. NIER 2,901,624
MASS SPECTROMETRY
Filed Sept. 2, 1947 6 Sheets-Sheet 6

Inventor
Alfred O. C. Nier
By Robert A. Lavender
Attorney

United States Patent Office 2,901,624
Patented Aug. 25, 1959

2,901,624

MASS SPECTROMETRY

Alfred O. C. Nier, Minneapolis, Minn., assignor, by mesne assignments, to the United States of America as represented by the United States Atomic Energy Commission Application September 2, 1947, Serial No. 771,728

6 Claims. (Cl. 250—41.9)

This invention relates to the art of mass spectrometry and particularly to gas analysis by mass spectrometry methods in large systems where it is desired to keep a continuous check, and to keep a record thereof, of the constituents of a mixture of gases, that is, of the components of a process gas. The invention has had particular applicability in connection with analysis of the process gas in a large gaseous diffusion type of plant for the separation of isotopes of a material by this method, that is, the gaseous diffusion method. This invention has been utilized and, in fact, has been found to be practically indispensable to the successful operation of an extremely large and extensive plant employing a vast number of gaseous diffusion reactor units, the plant occupying a very large area and creating the need for an apparatus and system capable of successfully sampling process gas at a large number of points in the plant, analyzing the samples in turn to determine the magnitude of each gaseous component in the mixture and providing a continuous reading or recording of the results of the sampling at a central point in the plant. Effective control of the process of isotope separation as a whole in a plant of this type is largely dependent upon the operator or operators having a continuous recording of samples of the process gas at a large number of points in the process system. Checking of the composition of the process gas is particularly important from the standpoint of discovering the existence of any in-leakage to the vacuum process system so as to be able immediately and effectively to combat the leakage. The requirement of the system is of course that the automatic apparatus analyze the process gas by determining in sequence the relative quantity or percentage of each component or constituent making up the mixture constituting the process gas. In mass spectrometry this is of course accomplished by measuring the magnitude of the ion current in a mass spectrometer resulting from ionization of each of the various gaseous components constituting the mixture.

My invention is concerned therefore primarily with a mass spectrometer system constructed and arranged to keep a continuous record of the concentration of several components of a gas mixture. The method of operation consists of measuring and recording in a prearranged and continually repeated sequence the ion peaks corresponding to the gas components. In effecting this result, my invention utilizes a type of recording instrument which responds to an electrical signal and prints upon a strip chart a series of points, or dots, so as to form a nearly continuous trace for each gaseous component in accordance with the magnitude of the electrical signals fed to it. The particular recording instrument itself may be one of various types of known commercial devices available for this purpose, and particularly the one which my invention employs is one adapted to print on a single strip chart a plurality of traces each one representing graphically the fluctuation in a separate quality or condition, and in my invention, each trace representing the magnitude of a particular component of the mixture constituting the process gas, the magnitude being that determined by the mass spectrometer. The recording instrument employed utilizes a single printing head preferably, to print a series of points or dots in response to the signal fed thereto so that successive dots form a series of traces on the strip chart. This type of recording is known in the art as the multiple point method and ordinarily a system set up to operate on this method can also be operated by means of manipulation of the system to operate manually or in accordance with the single point method.

My invention is particularly concerned with the system and circuit arrangements whereby the mass spectrometer tube is automatically set up to read or measure in sequence the various components of a mixture constituting a process gas and to then similarly feed in sequence an electrical signal related to each component to a recording instrument so that the latter instrument simultaneously produces a plurality of individual traces, or, that is, lines of dots or points representing the fluctuations in the individual components of the process gas. The signal from a mass spectrometer tube is, of cousre, extremely weak and requires a considerable amount of amplification before the signal is strong enough to be effective in being impressed upon the recording instrument. In changing the setup of the mass spectrometer tube so as to measure or read different components of the process gas in accordance with the relative masses thereof, there is a very large variation in the signal from the tube, that is, in the ionic current at the collector plate thereof. This is due to the large difference in the masses of the atoms of the various components and to the difference in the amount of each component in the gaseous mixture. Since a single instrument is used to record the magnitude of each component as described above, it is necessary to change the sensitivity of the amplifier considerably for each component in order to accommodate the amplified signal to the recording instrument. The recording instrument used embodies a galvanometer having a predetermined range, the recording instrument involving mechanical movements which operate in accordance with the displacement of the galvanometer, and thus it can be seen that the signal impressed on the recording instrument must be kept within a fairly limited range.

From the foregoing the broad objective of my invention will be understood, that is, to provide an apparatus and system for automatically maintaining a continuous check and record of a number of components of a mixture constituting a process gas.

More specifically an object of the invention is to provide a gas analysis system involving a mass spectrometer arranged to provide a continuous recording of the masses of a plurality of components of a process gas fed to the mass spectrometer tube, the system being arranged so that the tube measures the various components in a continuously repeated sequence or cycle, the recording means simultaneously making a recording of the readings or measurements as they are taken in sequence by the spectrometer tube.

Another object of the invention is to provide a spectrometer recording system as in the foregoing object having automatic arrangements for sequentially measuring the plurality of gaseous components, the system involving automatic mechanism for sequentially changing the accelerating voltage of the spectrometer tube to cause it to measure the different masses.

Another object of the invention is to provide an arrangement in a system as in the foregoing object wherein simultaneously with the automatic changing of the acceleration voltage of the mass spectrometer tube to read different masses, the sensitivity of the amplifier associated with the tube is automatically changed to accommodate the signal to the recording instrument so that the signal ultimately fed to the recorder is of a proper magnitude for the recorder to handle regardless of the mass being read by the spectrometer tube.

Further objects and multifarious advantages of my invention will become apparent from the following detailed description and annexed drawings wherein.

Figure 1:
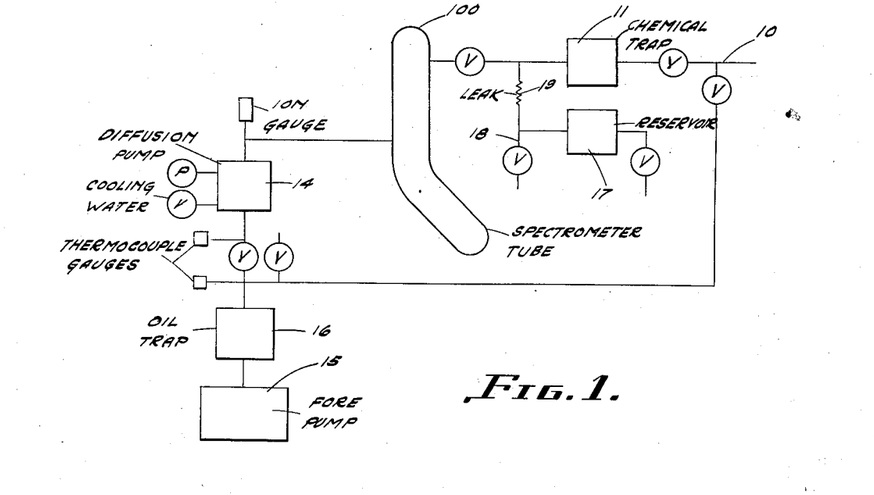
Fig. 1 is a diagrammatic representation of the spectrometer tube and its principal auxiliaries other than automatic controls.

Referring to Fig. 1 of the drawings, the spectrometer tube is shown at 100 and the process gas to be analyzed may be supplied to the tube through line 10 and this line may have therein a chemical trap 11 for the purpose of removing a component of the process gas which component may be one which would interfere with the proper operation of the tube if it were allowed to enter therein. The tube is maintained at a proper vacuum for operation by means of a diffusion pump 14 connected to the tube as shown, the diffusion pump being backed up by, that is, connected to a fore pump 15, in accordance with the usual practice, the connection being through oil trap 16.

Numeral 17 designates a reservoir for an auxiliary gas which may be used to calibrate the tube, the gas being allowed to enter the tube through a restrictor or leak 19. This appurtenance is, however, not in itself a part of my invention and is, therefore, not described in detail. An appropriate supply of cooling water as shown is used for cooling the diffusion pump and the system includes an ion gauge and thermo-couple gauges for measuring the vacuum as shown. Valves are shown at appropriate points in the various lines.

Figure 2:
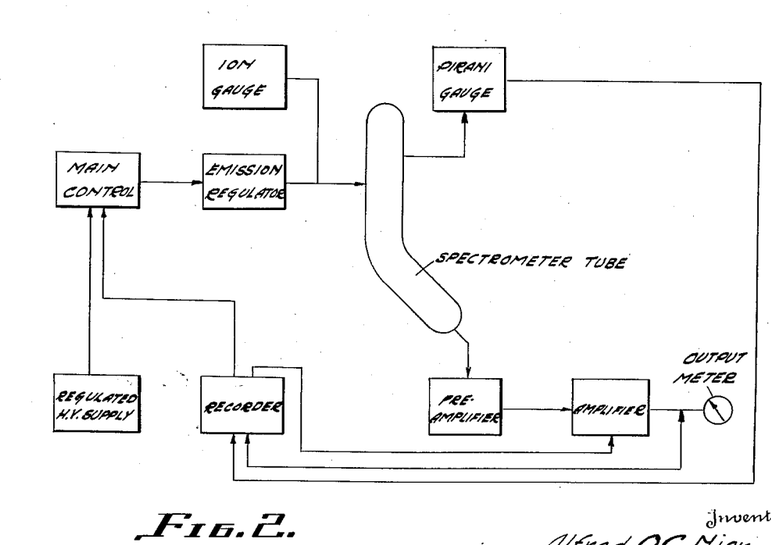
Fig. 2 is a diagrammatic representation in block form of the tube and the principal components of the control system.

In Fig. 2 the various electrical components of the control system, as well as the pressure measuring devices, are shown in block form and having appropriate legends thereon. A Pirani gauge is connected to the tube, that is, to the inlet tube to the spectrometer which conveys the process gas to the interior of the tube. An ion gauge as shown connects to the evacuating outlet of the spectrometer tube and the ion gauge is shown connects to an emission regulator. The emission regulator is a component which controls the power supply for the filament emission of the ionizing means within the spectrometer tube, as will be presently described, and for the accelerating electrode and certain focusing electrodes within the spectrometer tube, as will be described more in detail presently.

The signal from the spectrometer tube, that is, the electrical current from the collector plate, is carried to the component designated on this figure as pre-amplifier, this component constituting a stage of pre-amplification which is connected to the amplifier component as shown on the drawing. The amplifier is connected to an output meter on which the magnitude of the signal from the spectrometer tube can be read at any time as will be described presently. The amplifier is interconnected with the recording instrument, as shown on Fig. 2, as is the Pirani gauge, the details of the circuit arrangements constituting the interconnections involving the principal substance of my invention as will appear hereinafter. The recording instrument is connected as shown on Fig. 2 to the component designated main control which in turn is connected to the emission regulator. The main control connects to a component designated on the figure as a regulated high voltage supply. This supply furnishes regulated voltage for the main control as shown. The main control involves certain manual controls whereby various desired operations may be accomplished manually in lieu of full automatic control under which the system normally operates as will be described.

Referring now more particularly to Figs. 3 to 6 inclusive of the drawings, the circuit arrangements whereby the automatic sequencing is obtained are shown in detail. The spectrometer tube is shown at 100 having the usual shape and configuration of mass spectrometers as known in the art. The tube involves an evacuated envelope as previously described, and it has therein an ionization chamber designated by numeral 125 wherein the process gas is ionized by means of an ionizing arc struck therein, the arc being formed from electrons emitted from a filament or emitter as shown in 126 at one end of the ionization chamber. The ionization chamber has an anode or electron trap 124 at the end opposite the filament as shown which receives the bombarding electrons from the emitter. The tube has laterally extending circular portions directly opposite each other adjacent the ionization chamber as designated at 127 and 128 and through these portions, as shown at sections A—A and B—B, various of the leads to electrical elements within the tube are carried. Numerals 120 and 121 indicate diagrammatically the poles of a permanent magnet which produce a field in the direction of the length of the ionization chamber 125 in a manner well known in the art. Adjacent the ionization chamber are accelerating and focusing electrodes $X^1$, $X^2$, $X^3$, $X^5$ and $X^6$, as shown, the final electrode $X^6$ being connected to ground, as shown. The various leads to the ionization chamber and other electrical elements within the tube are carried to the tube through a cable N as designated on the figure, the lead to electrode $X^5$ being particularly significant, as will appear hereinafter. Reference will be made to the various electrical connections again presently.

Figure 3:
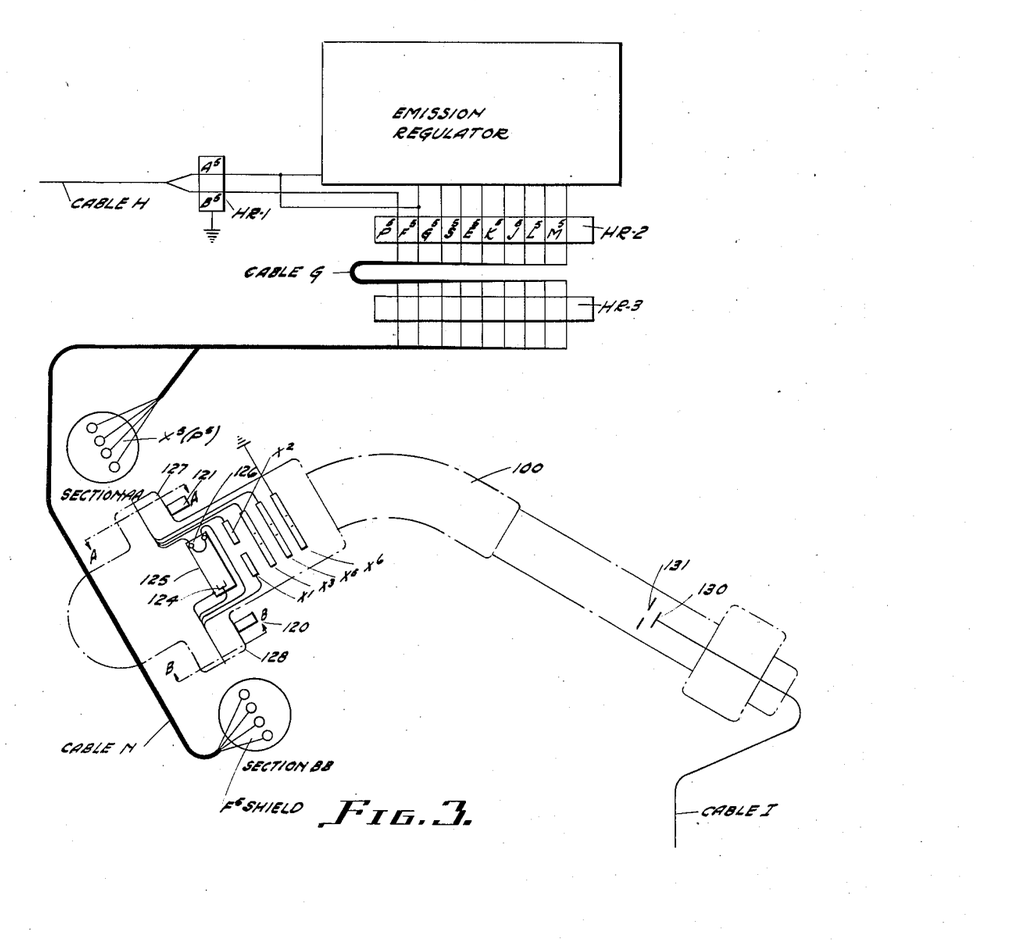
Fig. 3 is a diagrammatic representation of the spectrometer tube and the connections thereto.

Adjacent the opposite end of the spectrometer tube is a collector plate 130 arranged directly behind an opening or slit in a plate 131 as is conventional in spectrometer tubes. The collector plate which collects the ion current in the tube is connected as shown to the pre-amplifier as designated by legend on Fig. 4 through cable I. The pre-amplifier, as shown, constitutes a preliminary stage of amplification and is connected by cable J to the amplifier designated by legend on Fig. 4. The signal from the amplifier, which is a D.C. signal, is derived therefrom in the form of a potential difference between the leads 135 and 136, the lead 136 being grounded as shown. The pre-amplifier and the D.C. amplifier are not shown in detail since they in themselves do not constitute a part of my invention; they may be amplifiers of types already known and heretofore used in the art. The wire 135 connects to a wire identified as $L^3$ on a terminal panel BP–1 as shown. The ground wire 136 connects to wires 137 and 138, the latter connecting to a millivoltmeter 139 having a range of from 0 to 20 millivolts D.C. The wires 137 and 138 also connect to wire $N^3$ on panel BP–1, as shown. It will be seen that the meter 139 is in a shunt circuit to ground from the circuit carrying the signal from the D.C. amplifier and the meter may be connected in series with any one of a plurality of shunt resistors designated R36 through R44, inclusively. The meter is connected through a fixed resistor R45 to a slider S5 which may be manually moved into contact with any one of a plurality of taps associated with the various shunt resistors as shown, all of which are connected to wire 135. The shunt resistors serve to change the scale of the meter 139 when they are connected in circuit therewith and each resistor has a multiplier which the meter reading must be multiplied by to give the correct reading of voltage when that resistor is in circuit, these multipliers being 1, 2, 5, 10, 20, 50, 100, 200, 500, and 1,000 for the various positions of the slider S5 from left to right. The signal from the D.C. amplifier may be adjusted in magnitude, that is, a fraction of the signal of desired magnitude may be taken off for application to the recording instrument by means of a potentiometer or voltage divider formed by a bank of resistors R29 through R35, inclusively. The junctures between these resistors are connected to vertical rows of taps as shown. The taps in these vertical rows are also in horizontal rows as shown. Each of the horizontal rows has associated therewith a manually adjustable slider, as shown, which connects to one of series of wires $A^3$ through $H^3$, inclusively, extending through the panel BP-1, as shown. The various sliders are associated with terminal points designated by characters S6 through S13, inclusively, as shown. The wire $N^3$ connects to ground at wire 138, as shown; the wire $M^3$ connects to the juncture of resistors R34 and R35, as shown, and the wire $L^3$ connects to the wire 135. The manner of operation of the voltage divider just described will become more clear in connection with the detailed description of the various circuits hereinafter.

The electrical leads to the panel BP-1 are carried through a cable designated cable B to another terminal panel BR-2 (Fig. 5) which is associated with a rotary selector switch E1 having a rotary blade or finger associated with circularly arranged contacts as shown which forms part of and is operated by the recording instrument and which operates to simultaneously change the sensitivity of the amplifier in accordance with each sequential shift in the spectrometer tube from reading one mass to another. Before proceeding with a detailed description of the manner in which the sensitivity of the amplifier is changed, the nature of the recording instrument itself will be described.

Figure 7:
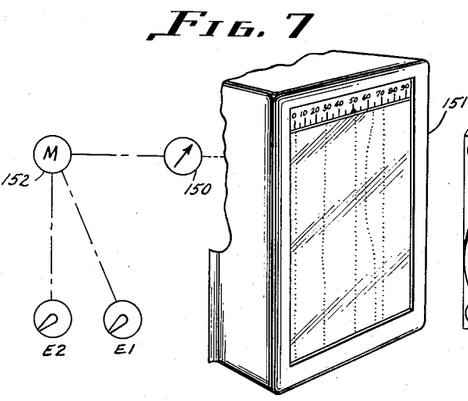
Fig. 7 is a schematic representation of pertinent mechanical aspects of the recording instrument.

As previously pointed out, in the preferred form of the invention the recording instrument is one which operates to produce a plurality of traces on a strip chart. Each one is related to a particular mass component of the process gas which is measured by the spectrometer. The recording instrument is a recording galvanometer type of instrument wherein a printing head produces a plurality of traces, each in the form of a series of dots in accordance with the displacement of the galvanometer as determined by the signal from the spectrometer tube. The instrument is shown in part in general outline in Fig. 7. Since no part of my invention resides in the recording instrument itself, it will not be described in detail. My invention resides principally in the manner and means of sequentially feeding signals to the recording instrument in accordance with the sequential modifying of the acceleration voltage of the spectrometer tube so that it reads different masses representing the various components of the process gas supplied to the tube. The recording instrument is designated in part by numeral 151 (see Fig. 7). This part of the instrument involves the strip chart on which the traces appear, the instrument involving an electric motor diagrammatically indicated at 152, which drives among other things, as will be described, the strip chart which, of course, is continuously moved to produce continuing traces thereon. The position of the printing mechanism which prints on the chart is mechanically determined by the operation of the driving motor which is controlled in response to the displacement, that is, the position of the galvanometer needle of galvanometer 150, the mechanical interconnections between the needle and the motor forming detailed apparatus which is well known in the art, and which is therefore not shown in detail since, as pointed out above, it in itself forms no part of my invention. An exemplary form of this type of apparatus may be found in and explained in detail in the patent of H. Brewer, No. 1,361,676. Fig. 7 diagrammatically represents the mechanical interconnections between the motor 152 of Fig. 5, the galvanometer 150, the recording mechanism 151, the rotary selector switch E1 and a second identical rotary selector switch E2 (see Fig. 5). Both of these switches will be described in greater detail presently. It may be said, however, that the rotary blade member of each may be rotated, for example, in my system, at a speed such as to make contact at twenty-four second intervals, this speed of course being appropriately synchronized with the movement of the strip chart.

Figure 5:
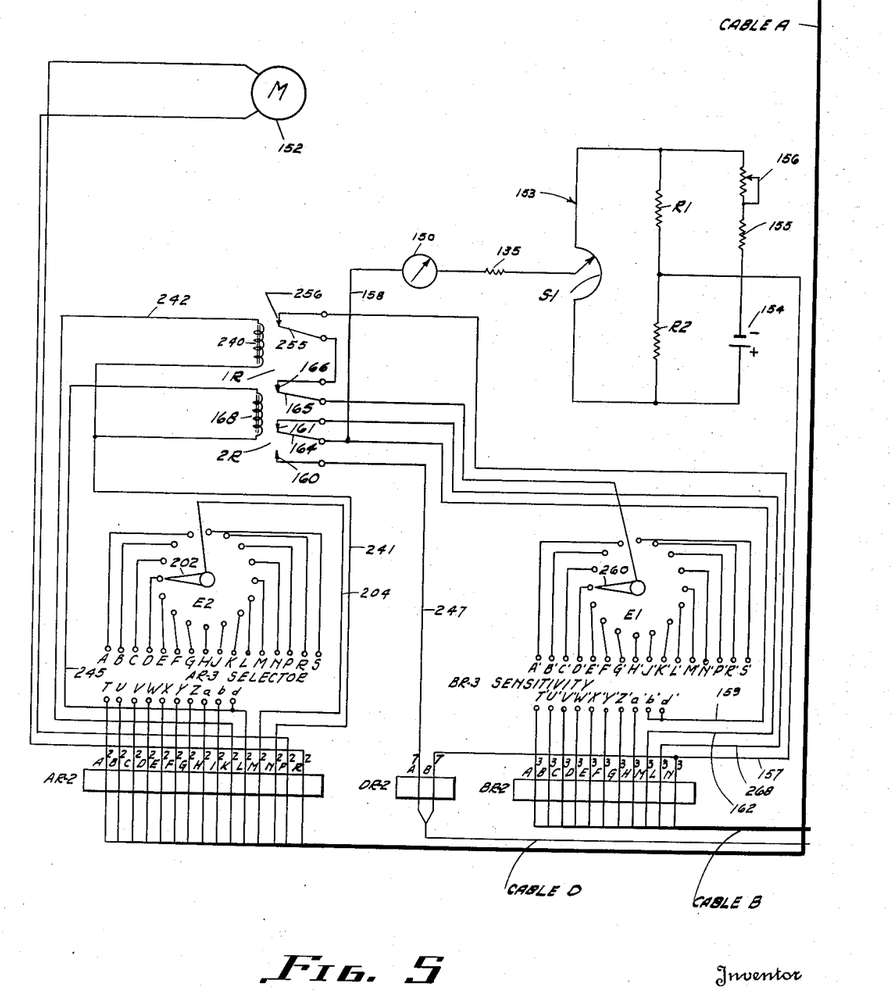
Fig. 5 is a partial wiring diagram illustrating diagrammatically the principal components of the recording instrument especially as related to the operating motor in the instrument.

The movements of the galvanometer needle, that is, its displacements are in response to a measuring circuit in the form of a Wheatstone bridge designated generally at 153 in the wiring diagram of Fig. 5. This bridge includes a slide wire potentiometer having a slider associated therewith as designated at S-1 on the drawing. The slider of the potentiometer in this type of measuring system is mechanically actuated by the motor so that it moves in a direction to always rebalance the galvanometer, that is, to return the galvanometer to its null position. This operation in itself is well known in the art. The slider connects to the galvanometer through fixed resistor 135. The bridge involves two similar resistors R1 and R2 connected in series. The two resistors are across the slide wire of potentiometer S-1. Power for the bridge is supplied by a battery 154 in series with a fixed resistor 155 and a variable resistor 156. In this circuit a standard cell may be provided in a manner well known in the art for periodically checking the voltage of battery 154. The battery and resistors are connected across the two similar resistors R1 and R2. The midpoint between the resistors R1 and R2 is connected by wire 157 to wire $N^3$ on the panel BR-2, and this wire in turn extends through cable B to panel BP-1 and, as described above, from there it is connected to ground at wire 138 as described above. The other lead 158 to the galvanometer connects to wire 159 which connects to the terminals $b'$ and $d'$ forming part of a multiple connection socket or receptacle designated BR-3 sensitivity which is of the type adapted to receive a plug having a number of prongs extending therefrom whereby desired connections can be effected. The receptacle and plug associated therewith will be described more in detail shortly. Wire 159 also connects to the movable contact member 164 of a relay 2R having a winding 168, and in and out contacts, that is, energized and de-energized contacts 160 and 161, respectively. Relay 2R has a second movable contact member 165 which engages a fixed contact 166 when the relay is de-energized. The relay 2R is de-energized in the position shown on the drawing. The contact 161 connects through wire 162 to wire $M^3$ of panel BR-2 and this wire connects through cable B to panel BP-1, and thence connects by wire 167 to the juncture of previously described resistors R34 and R35. In other words, with the parts in the position shown, the potential drop across resistor R35 is in series with the galvanometer in bridge circuit 153.

From the foregoing it is to be understood that the signal from the D.C. amplifier is in series with the galvanometer in the bridge circuit so as to cause the bridge to be unbalanced and the galvanometer to deflect accordingly. The sensitivity of the amplifier is automatically adjusted by selector switch E1, as will be explained presently, so that the galvanometer deflection depends on the magnitude of the signal and the sensitivity adjustment of the amplifier. The galvanometer deflects accordingly causing operation of motor 152 to actuate the printing mechanism so as to produce a trace in the form of a series of dots on the strip chart. As previously described, my invention resides in part in automatically changing the accelerating voltage applied to the spectrometer tube according to a predetermined timed sequence or program so that it reads or measures the masses of different components of the mixture of gas fed to the tube. Also, as previously described, each time the spectrometer tube is adjusted to read a different mass, the sensitivity of the amplifier is changed by means of the voltage divider comprising the resistors R29 through R35. Before proceeding with the detailed description of the manner in which the amplifier sensitivity is changed, the manner in which the system operates automatically to change the acceleration voltage impressed on the spectrometer tube will be described.

Figure 8:
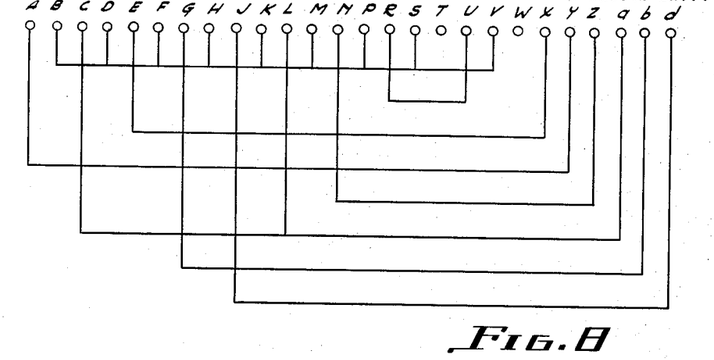
Fig. 8 is a diagrammatic showing the wiring of the program plugs used in the system.
Figure 9:
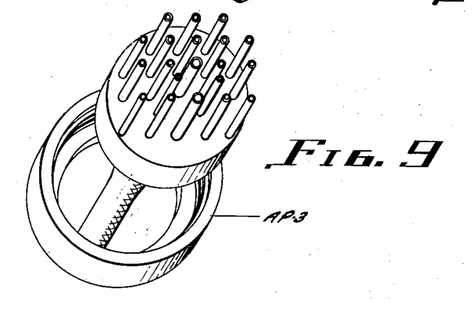
Fig. 9 is a view of one of the program plugs.
Figure 10:
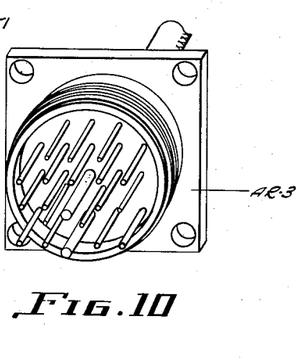
Fig. 10 is a view of one of the receptacles in which the program plugs are received.

The driving mechanism of the recording instrument includes an additional motor operated selector switch E2 which, as shown in Fig. 5, is a rotary switch comprising a rotatable contact blade or finger 202 which can be rotated to contact any one of a group of circularly arranged contacts which connect in order as shown on the drawing to the terminals A to S of receptacle AR-3. The receptacle AR-3 additionally includes terminals T through Z and terminals $a$, $b$, and $d$. The physical construction of this receptacle is shown in Fig. 10; it is a circular receptacle as shown having prongs adapted to engage a plurality of mating sleeve-like extensions formed on a mating plug which is shown in Fig. 9. The plug is designated AP-3 and embodies wiring between its terminals, that is, between the extensions, as shown in Fig. 8 whereby when the plug is inserted in the receptacle, connections are completed between various terminals of the receptacle as shown by the wiring of Fig. 8. The receptacle AR-3 and plug AP-3 embody screw threaded fittings as shown for securing the parts in assembled relationship in a manner well known in the art. The terminals T through Z and $a$ of receptacle AR-3 connect to wires $A^2$ through $H^2$ of a terminal panel AR-2, as shown, and the terminal $b$ of receptacle AR-3 connects to wire $I^2$ of panel AR-2. Terminal $d$ of receptacle AR-3 connects to wire $L^2$ of panel AR-2. The panel AR-2 also includes wires $K^2$, $M^2$, $N^2$, $P^2$, and $R^2$, as shown, and as will be presently referred to again, all of the wires of panel AR-2 connect through cable A to panel AR-1 shown on Fig. 6.

The rotary selector switch E2 and the plug associated therewith, which is a program plug since its wiring may be varied to produce various desired programs, as will be described, controls a bank of sequencing relays forming part of the main control referred to in connection with Fig. 2. This control is affected through wires $A^2$ through $H^2$ of panel AR-1 of Fig. 6. The slider of selector switch E2 (Fig. 5) is connected by wire 204 to wire $M^2$ on panel AR-2 and this wire from panel AR-1 is connected by wire 254 to contact point 205 which is designated Record and which forms part of a multiple point manually adjustable regulating switch which is to be designated Voltage Selector Switch and which will be described presently.

Figure 6:
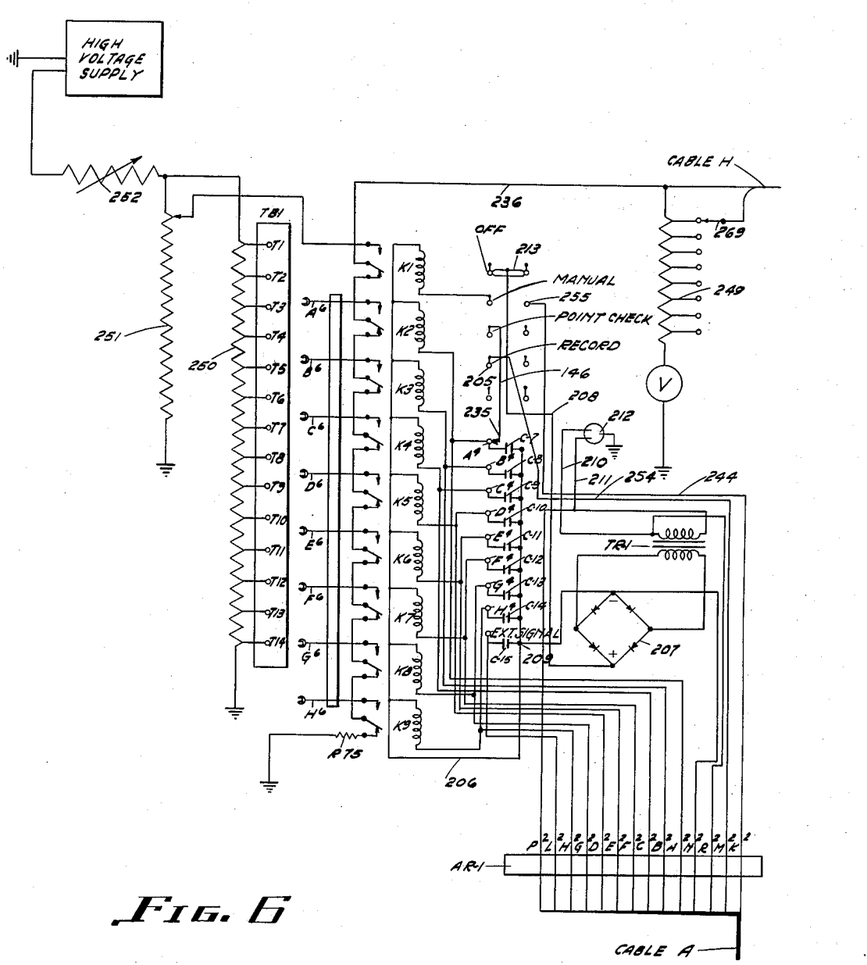
Fig. 6 is a partial wiring diagram showing the potential dividers for the tube accelerating voltage, the sequencing relays, manual switches, and certain power supplies.

The sequencing relays are designated by numerals K1 through K9, inclusive, each having a winding and a movable blade which has an in-contact and an out-contact associated therewith as shown on the drawing. The upper end of each of the relay windings of the K relays is connected to a common wire 206, as shown, which connects to point 209 and from there connects to one terminal of a power supply in the form of a copper oxide rectifier 207 of conventional type. The opposite terminal of the rectifier 207 connects to the movable member 213 of the previously described Voltage Selector Switch, by wire 208. The power supply for the rectifier 207 is from the secondary winding of a transformer TR-1 the terminals of which are connected to the remaining terminals of the rectifier 207 as shown.

The transformer TR-1 has a primary winding the terminals of which are connected by wires 210 and 211 to a supply of power from a 120 volt 60 cycle regulated source 212.

The previously referred to Voltage Selector Switch has four positions as shown on the drawing, and the switch in the position shown is in an Off setting. This switch involves a contact bar 213 which may be moved to positions bridging any one of four pairs of contact points as shown. The upper pair are the Off position of the switch as described and the other three are respectively designated Manual, Point Check, and Record as shown on the drawing. Wire 208 connects to the movable bridging member. There are no connections to the right hand contact point at the Off position of the Voltage Selector Switch, nor at the Point Check and Record Positions, but these terminals are available for variations in the control. When the Voltage Selector Switch is in the Record Position, the system operates to automatically energize the sequencing relays to change the accelerating voltage impressed on the spectrometer tube to cause it to read the masses of the various components of the mixture of gas fed to the spectrometer. The selector switch E2 as it rotates will energize the relays K2 through K9 sequentially according to a predetermined schedule, as will be described.

The lower ends of the windings of relays K2 and K9 are connected to the wires $A^2$ through $H^2$, inclusive, respectively, of the panel AR-1. The return circuit through the blade 202 of selector switch E2 is through the wire designated $M^2$, as described, and this wire of panel AR-1 is connected by wire 254 to the contact point 205 of the Voltage Selector Switch at the Record Position. When the Voltage Selector Switch is in the Record Position, the circuit continues through the member 213 of this switch and through wire 208 back to the lowermost terminal of the rectifier 207.

Summarizing the circuit connections whereby the relays K2 to K9 are automatically operated by the rotary selector switch E2, the upper ends of the windings of all these relays are connected to a common wire which connects to the negative terminal of the rectifier 207. The lower ends of the windings of these relays connect through wires $A^2$ and $H^2$, respectively on panels AR-1 and AR-2 to the receptacle AR-3. The plug associated with this receptacle is wired as shown in Fig. 8 to produce one typical program and, of course, as pointed out, it may be wired in different ways to produce different programs. As shown on Fig. 8, the wiring of the plug is such as to produce connections between the terminals on the receptacle AR-3 as indicated in the table below:

| Relay | Panel AR-1 AR-2 | Receptacle AR-3 | Receptacle (Connection made through Program Plug) AR-3 |
|---|---|---|---|
| K2 | $A^2$ | T | R |
| K3 | $B^2$ | U | |
| K4 | $C^2$ | V | B—D—F—H—K—M—P—S |
| K5 | $D^2$ | W | |
| K6 | $E^2$ | X | E |
| K7 | $F^2$ | Y | A |
| K8 | $G^2$ | Z | N |
| K9 | $H^2$ | $a$ | L—C |
| | $I^2$ | $b$ | G |
| Ext. Sig | $L^2$ | $d$ | (Relay 2R)—J |
| | $P^2$ | | (power) |
| | $R^2$ | | (power) |

From an inspection of the table it will be observed that relay K4 becomes energized whenever the rotary member 202 of selector switch E2 contacts any one of its associated contacts connecting to terminals B, D, F, H, K, M, P, or S of receptacle AR-3. Similarly relay K3 is energized when the rotary selector switch E2 makes contact with its associated contact connected to terminal R; relays K6, K7, and K8 are energized when the rotary switch E2 makes connections to terminals E, A, and N, respectively. Relay K9 is energized when the rotary switch E2 makes connections with terminals L and C as already pointed out. The continuation of all of the circuits is through the rotary member 202 of the selector switch E2 through wire 204 and wire M², on panels AR–2 and AR–1 through wire 254 to the Voltage Selector Switch and back through the wire 208 to the positive terminal of the rectifier 207.

When the rotary selector switch E2 makes connections to terminal J, a circuit is completed through terminal $d$ on receptacle AR–3 and thence to the winding of relay 2R through wire 245, wire 241, wire N² on panels AR–2 and AR–1 back to the negative terminal of rectifier 207. This energizes relay 2R which opens its de-energized or upper contacts 161 and 166 disconnecting the amplifier from the recording instrument, and also disconnecting the amplifier sensitivity selector switch E1, and instead connecting the Pirani gauge to the recording instrument. Engagement of the lower contact 160 of relay 2R connects wire 158 through this contact to panel DR–2 which in turn through cable D connects the Pirani gauge into the galvanometer circuit of the recording instrument, wire B⁷ of panel DR–2 connecting to wire N³ which connects to the bridge circuit through wire 157. Thus at one point in the sequence, the rotary selector switch E2 automatically connects the Pirani gauge to the recording instrument so that one of the 16 points recorded by the instrument is the reading of the Pirani gauge.

Connected between the lower end of each of the windings of relays K2 through K9 and the negative terminal of the rectifier 207 are a group of condensers designated C–7 through C–15. The purpose of these condensers is to minimize arcing across the relay windings. One side of these condensers is each connected to a fixed contact point which forms a part of a manually operated multiple contact switch the various contact points being respectively designated by the letters A⁴ through H⁴ and External Signal. Associated with these contact points A⁴ through H⁴ is a manually adjustable sliding contact 235 which connects to one of the terminals forming the Point Check position of the Voltage Selector Switch. The purpose of the Point Selector Switch just described will be described more in detail presently.

The de-energized contacts of all of the K relays are connected in series when the relays are de-energized, as shown on the drawing, producing a circuit which connects to ground at the lower end through a fixed resistor R75, and at its upper end connects to wire 236. Wire 236 is the wire through which the voltage signal is carried to the mass spectrometer tube for controlling the acceleration voltage impressed upon its accelerating electrode. This wire connects to wire A⁵ of panel HR–1 through cable H which will be referred to again presently. The upper contacts, that is, the energized contacts of the relays K2 through K9 are connected by wires A⁶ through H⁶, respectively, to a group of corresponding clips which may be clipped to terminal posts T1 to T14 on a terminal panel designated TB–1. The terminals or posts on the panel TB–1 are connected to regularly arranged taps on a potential divider 250 constituting the main potential divider from which a potential is selected for impressing on the accelerating electrode of the spectrometer tube. The main potential divider is connected in parallel with another potential divider 251 shown on the drawing and these two dividers are in series with a variable resistor designated on the drawing at 252. The slider of divider 251 connects to the energized contact of relay K1. It will be noted that the lower end of the winding of relay K1 connects to the Voltage Selector Switch at the contact point designated Manual. Thus, by manually energizing the relay K1, the manual potentiometer is connected to the spectrometer tube whereby the voltage impressed on the accelerating electrode thereof may be manually controlled.

When the Voltage Selector Switch is in the position designated Manual, the spectrometer tube is placed under control of the manual potential divider as described whereby the accelerating voltage may be varied in any manner and in any desired increments for the purpose of searching for the presence of gaseous components in the tube which may have any of various masses and the presence of which the operator might not be aware of without such searching. When thus operating manually, it is not desired that the selector switch E1 be effective to automatically change the sensitivity of the amplifier in accordance with the regular program as happens when the system is operating fully automatically. Thus when the Voltage Selector Switch is in its Manual position, the rotary sensitivity selector switch E1 is disconnected. This is brought about by relay 1R which is normally de-energized and which becomes energized upon moving the Voltage Selector Switch to the Manual position. Relay 1R has a winding 240 as shown and a movable blade 255 which moves away from its associated upper contact 256 when the relay is energized interrupting the circuit to the slider of the rotary switch E1. The winding of relay 1R is connected by wire 241 to the wire N² at panel AR–2 and wire N² connects from panel AR–1 to the negative terminal of the rectifier 207. The other end of the winding of relay 1R is connected by wire 242 to the wire K² at panel AR–2 and wire K² connects from panel AR–1 by way of wire 244 to contact point 255 at the Manual position of the Voltage Selector Switch so that when the said switch is in this position, the circuit is completed energizing relay 1R through wire 208 back to the positive terminal of the rectifier 207.

When the Voltage Selector Switch is in its Point Check position, the system is set up whereby the operator can manually energize any individual one of the relays K2 through K9 rather than these relays being energized in sequence as in normal full automatic operation. Thus, when the Voltage Selector Switch is in its Point Check position, the Point Selector Switch is made effective and it may be set to any one of its positions A⁴ through H⁴ and External Signal.

The Point Selector Switch includes slider 235 which may engage any one of contacts A⁴ through H⁴ and an additional contact as described marked External Signal. When the slider engages the contacts A⁴ through H⁴, circuits are produced for energizing individually the relays K2 to K9, inclusive, by completing circuits which shunt the panels AR–1 and AR–2 and the rotary selector switch E2 as may be observed by inspection of the wiring. These circuits are completed from the contacts A⁴ to H⁴, inclusive, through wire 146 to the Point Check position of the Voltage Selector Switch and from this switch through wire 208 back to the positive terminal of rectifier 207. Thus, in this manner any individual relay can be energized for placing its corresponding accelerating voltage on the spectrometer tube so that the reading of any particular mass can be taken unhurriedly.

When the slider 235 is moved to engage the contact marked External Signal, a circuit is completed through wire L² on panels AR–1 and AR–2 for energizing relay 2R in the same manner as described above. As a result the Pirani gauge is connected to the recording instrument for taking a reading of the pressure as measured by this gauge. Thus, in this manner at any time the pressure as measured by the Pirani gauge can be manually caused to be recorded.

When the Voltage Selector Switch is in Point Check position, energization of relay 2R disconnects rotary selector switch E1 as previously described so that it is ineffective to change the amplifier sensitivity.

It will be observed that wire 245 (Fig. 5) is connected to terminal $d$ on the AR–3 receptacle so that the reading from the Pirani gauge can be included in the program as desired in accordance with the program as established by the wiring of the plug AP–3 which cooperates with the receptacle AR–3.

Figure 4:
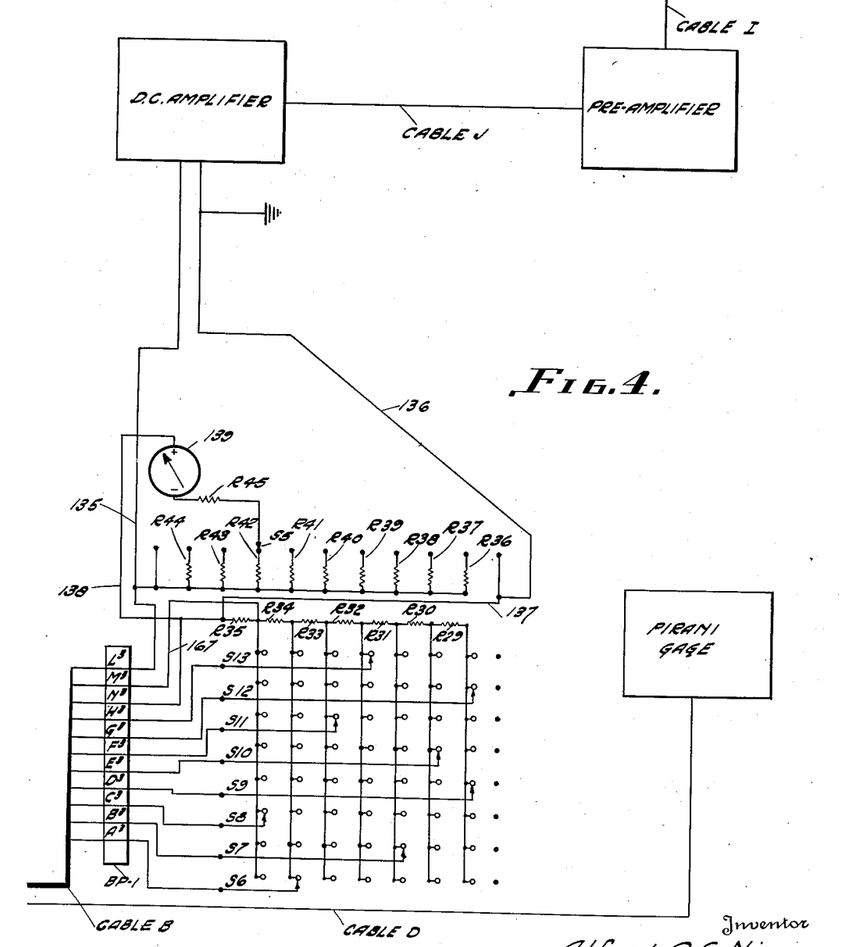
Fig. 4 is a wiring diagram of the amplifier sensitivity adjusting potential divider and certain other components of the system.

As previously described, during the automatic sequence, that is, during the program of changing the accelerating voltage applied to the spectrometer tube, the sensitivity of the amplifier must be correspondingly changed to accommodate the signal to the recording instrument since different masses, as read by the spectrometer tube, will result in widely different currents from the collector plate. This result is accomplished by the selector switch E1 in cooperation with the potential divider comprised of the resistors R29 through R35. (See Fig. 4.) The selector switch E1 is identical with the selector switch E2 and operates synchronously therewith. It involves a similar rotating contactor finger 260 and corresponding fixed circularly arranged contacts connected in order to terminals forming part of a multiple socket receptacle BR-3 which is like the previously described receptacle AR-3 having similar terminals designated by primed characters. Receptacle BR-3 is arranged to receive a plug having a number of extensions which is like the previously described plug AP-3 of Fig. 9. It is wired the same as in Fig. 8. The plugs may, of course, be wired differently to give different desired programs, that is, to vary the sequence in which the relays are energized and consequently to vary the sequence in which the spectrometer tube reads the masses of the various components of the process gas fed thereto. The plug associated with receptacle BR-3 is normally wire the same as plug AP-3, the arrangement being that selector switch E1 selects a sensitivity control channel appropriate to the accelerating voltage impressed on the spectrometer tube. The receptacle BR-3 has terminals designated by primed characters similar to receptacle AR-3 which connect to the terminals $A^3$ through $H^3$ of panel BR-2 which are similarly connected to correspondingly designated terminals on the panel BP-1. (Fig. 4.)

The selector switch E1, as previously pointed out, works synchronously with selector switch E2 and each time that the selector switch E2 completes a circuit for energizing any one of the K relays causing a corresponding accelerating voltage to be impressed on the spectrometer tube, the selector switch E1 appropriately adjusts the sensitivity of the D.C. amplifier. As previously described, the K relays may be connected to the 14 points on the panel TB-1 so as to selectively impress any one of 14 voltages on the accelerating electrode of the spectrometer tube to read a component of different mass or a group of masses. The relationship between the divider points on panel TB-1 and the masses are expressed in the table below:

| Main divider point: | Mass |
| --- | --- |
| 1 | 14 |
| 2 | 18 |
| 3 | 19–20 |
| 4 | 24 |
| 5 | 28 |
| 6 | 29–30 |
| 7 | 31 |
| 8 | 32 |
| 9 | 33–34 |
| 10 | 44 |
| 11 | 45–67 |
| 12 | 68–70 |
| 13 | 71–105 |
| 14 | 333 |

Thus, whenever a circuit is completed from one of the leads to panel AR-2 for energizing one of the K relays, a corresponding circuit is completed from panel BR-2 to panel BP-1 for appropriately adjusting the sensitivity of the D.C. amplifier. As previously pointed out, the program or schedule according to which the relays are sequentially energized depends upon the wiring of the program plugs AP-3 and BP-3 and further description of these plugs and the manner in which they determine the program sequence will be given presently.

Assuming now that selector switch E2 has moved to a position wherein a circuit is completed for energizing relay K6, for example, this circuit will be through the wire designated by character $E^2$ on panel AR-2. Similarly, selector switch E1 will complete a circuit through wire $E^3$ on panel BR-2 and this circuit will be traced as representative of the various circuits which may be completed by selector switch E1 for changing the sensitivity of the D.C. amplifier. Beginning with wire 135 from the D.C. amplifier (Fig. 4), the circuit is through wire $L^3$ on panel BP-1 to panel BR-2, through wire 268, the contact 256 of relay 1R, the corresponding contact 166 of relay 2R to the rotatable blade 260 of selector switch E1 through terminal E' of the receptacle BR-3, and through the program plug BP-3 to terminal X' of the receptacle BR-3 (referring to Fig. 8 which shows the wiring of plug BP-3, it will be seen that terminal E' connects to terminal X'); terminal X' of the receptacle BR-3 connects to wire $E^3$ on panel BR-2; the circuit continues to panel BP-1 and thence to point S10 and its corresponding slider to the juncture of resistors R29 and R30 and thence through resistors R30, R31, R32, R33, and R34 through wire 167 to wire $M^3$ on panel BP-1 through cable B to panel BR-2 through wire 162 to the de-energized contact 161 of relay 2R through wire 158, galvanometer 150 in the bridge circuit 153 to wire 157 to wire $N^3$ of panel BR-2 and panel BP-1 and back to ground at wire 138. Thus, from the foregoing circuit is to be seen that the signal impressed on the bridge circuit 153 is equivalent to the voltage drop across the resistors R30 to R34, inclusive. As described above, for each different accelerating voltage that is impressed on the spectrometer tube, the sensitivity of the amplifier will be reset in this manner. The sensitivity is determined by the various circuits corresponding to the one just described extending through the points S6 to S13. The magnitude of the signal is dependent on the settings of the sliders associated with these points.

Referring again to wire 236 which carries the signal to the spectrometer tube through the panel HR-1 as described (Figs. 3 and 6), it will be seen that this wire connects to the upper end of the potential divider 249 which is termed the Focus divider since its function is to maintain the potential on the focusing electrode in the spectrometer tube at a predetermined fraction of the voltage impressed on the accelerating electrode. The lower end of this divider is connected to ground and it has a plurality of taps as shown having a movable slider 269 associated therewith. The slider 269 is connected to wire $B^5$ at panel HR-1 and this connection continues to wire $P^5$ at panel HR-2. Wire $P^5$ at the panel HR-2 is connected through cable G, panel HR-3 and through cable N to the spectrometer tube, this lead connecting to the focusing electrode $X^5$. The wire 236, as described, connects to wire $A^5$ at panel HR-1, thence to the emission regulator and also connects by way of wire $F^5$, cable G, panel HR-3 and cable N to the shield in the ionization chamber of the spectrometer tube. The emission regulator embodies a regulated power supply and control means for closely regulating the emission from the filament in the ionization chamber of the spectrometer tube. Control of the emission in an ionization chamber and the regulating means itself are devices well known in the art and since they in themselves do not form any part of my invention, they are not disclosed in detail.

The emission regulator additionally through leads $G^5$, $S^5$, $E^5$, $K^5$, $J^5$, and $L^5$, as shown, controls the voltages impressed on the filament in the ionization chamber, the trap, and the electrodes $X^1$, $X^2$, and $X^3$. The entire emission regulator case is carried at the potential of wire 236 ($A^5$) so that the potentials of the filament and electrodes $X^1$, $X^2$, and $X^3$ of the spectrometer tube are dependent thereon and the differential in potential between these elements remains the same. The potential of the focusing electrode $X^5$, however, depends upon the setting of potential divider 249 as described so that the differential of potential between electrodes $X^3$ and $X^5$ varies whenever the accelerating voltage impressed on the spectrometer tube is changed so as to cause it to read different masses.

From the foregoing, those skilled in the art will observe that I have provided a fully automatic system whereby a continuous recording is kept of the relative proportions of various components of a gaseous mixture supplied to the spectrometer tube. The spectrometer tube is automatically reset in accordance with a predetermined program or schedule to read different masses. The recording intrument automatically operates to record and produce a trace for each separate mass as its magnitude is read by the spectrometer tube. Automatic operation may be discontinued at any time permitting the operator to manually select any desired predetermined accelerating voltage and apply it to the spectrometer tube so as to unhurriedly check the reading obtained at that particular setting. Furthermore, the system may be manually adjusted as described so as to infinitely vary the accelerating voltage so as to search for traces of any possible gaseous components that may be in the mixture by varying the accelerating voltage continuously rather than in steps. The programming arrangement provides for having any desired program or schedule of automatically taking readings and the schedule may include taking a reading of the Pirani gauge or the ion gauge at one or more points in the sequence or schedule. Sensitivity of the amplifier is automatically reset during the automatic cycle to approximately accommodate the signal to the recording instrument and, as described, the automatic resetting of the sensitivity is rendered ineffective when the system is set up for manual operation.

Having thus described my invention, I claim:

1. In a mass spectrometer having an accelerating electrode therein, in combination, a source of a plurality of voltages adapted to be impressed on the accelerating electrode of the mass spectrometer, a plurality of automatic switches, circuit connections interconnecting the voltage source, the switches and the mass spectrometer so arranged that closing of individual switches causes a particular voltage to be impressed on the accelerating electrode of the spectrometer, automatic operating mechanism for the automatic switches comprising electrically energizable windings associated with each automatic switch and a motor driven multiple contact rotary type of switch having circuit connections arranged to energize the said windings in accordance with a predetermined timed schedule of operations whereby the automatic switches operate in accordance with the said schedule and accordingly voltages of desired magnitude are impressed upon the accelerating electrode of the spectrometer in accordance with the predetermined schedule, manual switch means for disconnecting said rotary switch and including contacts for individually manually energizing said windings to impress a particular voltage on said accelerating electrode, a manually adjustable voltage divider and connections controlled by said manual switch means for connecting said voltage divider to said accelerating electrode.

2. In a mass spectrometer having an accelerating electrode therein, in combination, a source of a plurality of voltages adapted to be impressed on the accelerating electrode of the mass spectrometer, a plurality of automatic switches, circuit connections interconnecting the voltage source, the switches and the mass spectrometer so arranged that closing of individual switches causes a particular voltage to be impressed on the accelerating electrode of the spectrometer, automatic operating mechanism for the automatic switches comprising electrically energizable windings associated with each automatic switch and a motor driven multiple contact rotary type of switch having circuit connections arranged to energize the said windings in accordance with a predetermined timed schedule of operations whereby the automatic switches operate in accordance with the said schedule and accordingly voltages of desired magnitude are impressed upon the accelerating electrode of the spectrometer in accordance with the predetermined schedule, an amplifier arranged to amplify a signal received from the mass spectrometer, voltage divider means receiving an amplified voltage signal from said amplifier and having a plurality of taps and circuit connections for taking off a variable portion of the voltage signal, and a second rotary type motor driven multiple contact switch having a plurality of contacts and circuit connections to said voltage divider means for variably adjusting the said portion of the voltage signal.

3. In a system of the class described, in combination, a mass spectrometer arranged to have a gaseous mixture having a plurality of components admitted thereto, a voltage divider having a plurality of taps and circuit connections enabling the accelerating electrode of said mass spectrometer to have any one of a plurality of voltages impressed thereon, an automatic contacting device having sequentially operated contacts controlling said aforementioned circuit connections to cyclically impress predetermined voltages on the accelerating electrode of said mass spectrometer in accordance with a regular pre-arranged schedule, an amplifier connected to amplify the signal from said mass spectrometer, a voltage divider receiving an amplified voltage signal from said amplifier and having a plurality of taps and circuit connections, and a second automatic contacting device having sequentially operated contacts controlling said last-mentioned circuit connections to take off a signal adjusted in conformity with the accelerating voltage impressed on the mass spectrometer.

4. In a system of the class described, in combination, a mass spectrometer having an accelerating electrode, an accelerating voltage supply circuit connected to said accelerating electrode, a collector electrode, and an output circuit connected to said collecting electrode, said voltage supply circuit including a source of a plurality of voltages of different magnitudes and a set of switches and associated circuit connections for applying any one of said voltages to said accelerating electrode, motor driven means for closing said switches one at a time in a scheduled sequence, said output circuit including means for deriving a plurality of voltage signals all proportional to the ion current impinging upon said collector but having different proportionality constants and a set of switches and associated circuits for taking off any one of said voltage signals, motor driven means for closing said last-named switches one at a time in a scheduled sequence, and driving means for continuously and automatically operating both of said switch closing means in synchronism with each other.

5. In a system of the class described, in combination, a mass spectrometer having an accelerating electrode, an accelerating voltage supply circuit connected to said accelerating electrode, a collector electrode, and an output circuit connected to said collecting electrode, said voltage supply circuit including a source of a plurality of voltages of different magnitudes and a set of switches and associated circuit connections for applying any one of said voltages to said accelerating electrode, motor driven means for closing said switches one at a time in a scheduled sequence, said output circuit including means for deriving a plurality of voltage signals all proportional to the ion current impinging upon said collector but having different proportionality constants and a set of switches and associated circuits for taking off any one of said voltage signals, motor driven means for closing said last-named switches one at a time in a scheduled sequence, a motor driven recorder of the type capable of printing a plurality of traces in response to a plurality of signals fed thereto, means connecting to said recorder the voltage signal taken off from said output circuit, and driving means for continuously and automatically driving, in synchronism, said recorder and both of said switch closing means.

6. In a system of the class described, in combination, a mass spectrometer having an accelerating electrode, an accelerating voltage supply circuit connected to said accelerating electrode, a collector electrode, and an output circuit connected to said collecting electrode, said voltage supply circuit including a source of a plurality of voltages of different magnitudes and a set of switches and associated circuit connections for applying any one of said voltages to said accelerating electrode, motor driven means for closing said switches one at a time in a scheduled sequence, said output circuit including means for deriving a plurality of voltage signals all proportional to the ion current impinging upon said collector but having different proportionality constants and a set of switches and associated circuits for taking off any one of said voltage signals, motor driven means for closing said last-named switches one at a time in a scheduled sequence, a motor driven recorder of the type capable of printing a plurality of traces in response to a plurality of signals fed thereto, means connecting to said recorder the voltage signal taken off from said output circuit, driving means for continuously and automatically driving, in synchronism, said recorder and both of said switch closing means, and a pressure gauge associated with said mass spectrometer for producing a voltage signal proportional to the operating pressure of said spectrometer, said last-named set of switches and associated circuits including one switch and associated circuit for taking off the output voltage signal from said pressure gauge in place of a signal from said collector output circuit.

References Cited in the file of this patent

UNITED STATES PATENTS

| 2,092,896 | Stinchfield | Sept. 14, 1937 |
| 2,331,190 | Hipple | Oct. 5, 1943 |
| 2,370,631 | Berry | Mar. 6, 1945 |
| 2,374,205 | Hoskins | Apr. 24, 1945 |
| 2,380,439 | Hoskins et al. | July 31, 1945 |
| 2,397,560 | Olesen | Apr. 2, 1946 |
| 2,413,668 | Washburn | Dec. 31, 1946 |
| 2,467,948 | Sturm | Apr. 19, 1949 |
| 2,469,213 | Shea | May 3, 1949 |

OTHER REFERENCES

Smith et al.: Review of Scientific Instruments, February 1937, vol. 8, pp. 51–55.